April 14, 1942.                C. L. EPPLER                    2,279,816
                        METHOD OF MAKING A SHEAVE
                          Filed May 22, 1939

INVENTOR.
CHRISTIAN L. EPPLER
BY
ATTORNEYS

Patented Apr. 14, 1942

2,279,816

UNITED STATES PATENT OFFICE 2,279,816

METHOD OF MAKING SHEAVES

Christian L. Eppler, Detroit, Mich., assignor to Midwest Tool & Manufacturing Company, Detroit, Mich., a corporation of Michigan Application May 22, 1939, Serial No. 275,071

4 Claims. (Cl. 29—159)

The invention relates to a method of making sheaves and refers more particularly to sheaves for use with V-shaped belts.

The invention has for an object to provide an improved method of forming sheaves of relatively light weight and great strength.

The invention has for another object to provide an improved method of forming sheaves with belt engaging faces formed to have efficient belt-driving contact and to minimize the belt wear.

The invention has for a further object to provide an improved sheave of relatively light weight and strong, durable construction and formed with a V-shaped belt receiving groove having smooth, burnished belt engaging faces.

These and other objects of the invention will become apparent from the following description, taken in connection with the accompanying drawing, in which Figure 1 is a side elevation of a sheave embodying the invention;

Figure 1:
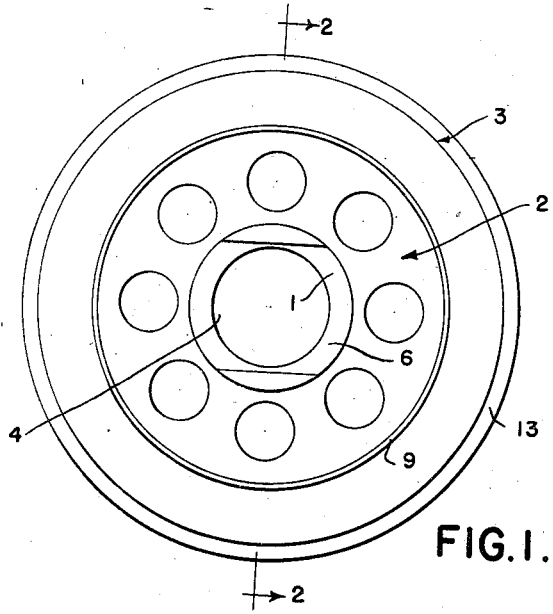
Figure 2:
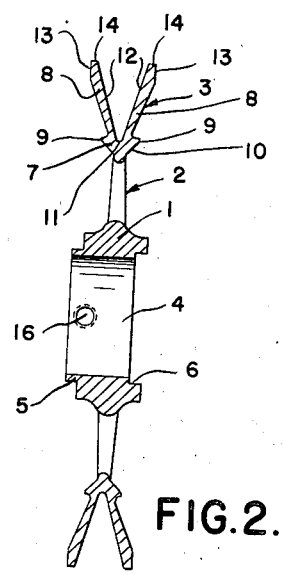
Figure 2 is a cross section on the line 2—2 of Figure 1.
Figure 4:
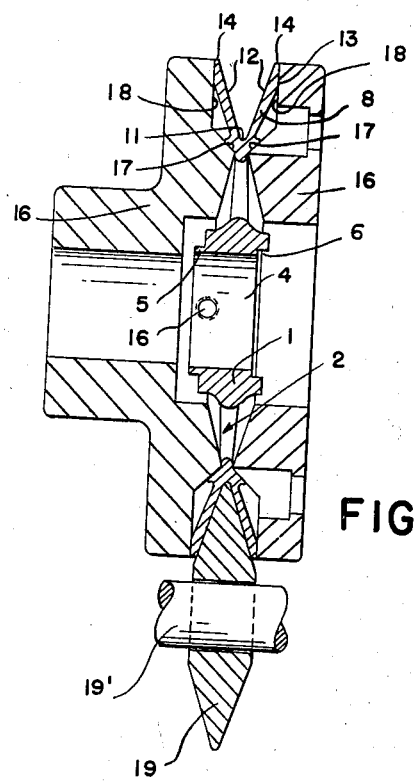
Figures 3 and 4 are sections through the rim illustrating different steps during its manfacture.

The sheave embodying the invention comprises the hub 1, the web 2 and the rim 3. The hub has the cylindrical axial hole 4 therethrough and it has at one end the tongue 5 and at the other end the groove 6. The width of the tongue is slightly less than that of the groove so that in a sheave assembly the tongue of one sheave has a sliding fit in the groove of the adjacent sheave. The web, as illustrated, is in the nature of a disc having circular openings therethrough to, in effect, form spokes, and in this connection it is apparent that differently shaped openings may be used and that the web may have spokes extending completely from the hub to the rim.

The rim has the base 7 and the radially outwardly diverging flanges 8 extending from the base. The base is provided with the lateral extensions 9 having their radially outer faces merging into the outside faces of the flanges. These extensions have their radially inner faces registering with corresponding faces upon the base to provide the annular radially inwardly facing shoulders 10 which extend from the web to the outside faces of the base. The base is also provided with the arcuate face 11 which merges into the inside faces 12 of the flanges, the arcuate and inside faces forming a V-shaped groove 15 for receiving a V-shaped belt. The portions 13 of the outside faces of the flanges near their peripheries preferably extend radially or at right angles to the axis of the sheave and the peripheral faces 14 of the flanges are preferably cylindrical.

The sheave is formed of malleable iron and the inside faces of the flanges which form the side walls of the groove are very smooth and highly burnished to possess efficient belt driving contact and to eliminate undue belt wear.

Figure 3:
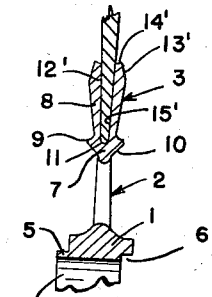

The sheave is manufactured from a malleable iron casting and the first operation upon the casting in the manufacture comprises drilling and reaming the opening 4 in the hub and facing one end of the hub by machining the same. The second operation comprises facing the other end of the hub, during which the sheave is preferably mounted upon a fixture pilot. The sheave blank is then secured upon a revoluble arbor and while it is being rotated the rim is operated upon by suitable cutting tools to form the peripheral faces 14', the outside faces 13' near the periphery, the outside faces of the base 7 and the radially inner faces 10 of the base. With the large sizes of sheaves the outside faces radially inwardly of the face portion 13' are also preferably rough-turned. In addition to these steps, the sheave blank has cut therein the groove 15' by means of a cutter which is axially fixed relative to the sheave blank. The cutter, in addition to having an arcuate cutting edge at its end to form the arcuate face 11, has cutting edges at its sides so that the cutter, in addition to cutting the groove 15', also cuts the side walls 12' of this groove to remove the tool marks and smooth the side walls. It will be noted that the side walls of the grove formed at this time slightly flare radially outwardly. The sheave blank after these operations have been carried out is illustrated in Figure 3.

After these operations, the groove 6 and tongue 5 are cut by suitable cutting tools. Then the hub is drilled and tapped to form the threaded hole 1'.

The next operation comprises mounting the sheave blank between the sections 16 of a revoluble chuck. These sections have the beveled shoulders 17 of the same inclination as the annular shoulders 10 of the rim base and engage the annular shoulders to support the sheave directly through the rim and independently of the web and hub of the sheave. These sections also have the radially extending walls 18 which are adapted to engage the outside face portions 13' of the rim flanges. After the sheave blank has been mounted in the chuck, the roller 19 is moved into the groove 15'. This roller has beveled side faces of substantially the same inclination as the finished side walls 12 of the groove 15. The roller is preferably freely axially movable upon the shaft 19' so that as it is urged toward the sheave and into engagement with the side walls 12' of the groove 15' it is free to follow the metal in either flange 8 until that flange has come in contact with the wall 18 of the adjacent chuck section, after which the roller operates upon the other flange to move it against the other chuck section. As a result, the roller does not exert a rolling pressure which is greater on one side wall of the groove than on the other side wall. During the rolling operation the contacting faces of the roller and side walls of the groove are relatively movable across each other so that as a result the side walls of the groove are highly burnished while they are being spread apart to the desired angle. During the rolling operation the lateral extensions upon the rim base provide reinforcement for enabling the bending of the metal without fracture.

What I claim as my invention is:

1. The method of forming a sheave which comprises providing a cast malleable iron body having a web and a rim, the latter having a base and a portion extending radially outwardly from the base, and the base having lateral extensions at its sides projecting beyond the adjoining parts of the radially outwardly extending portion and providing radially inwardly facing annular shoulders, cold working the body by steps comprising forming an annular radially outwardly opening groove in the radially outwardly extending portion with the groove extending to a zone between the extensions to thereby provide spaced side walls, supporting the body through the annular shoulders, meanwhile spreading apart the side walls by applying rolling pressure thereon in a direction generally toward the axis of the sheave and bending the side walls in opposite axially outward directions about the base and extensions to thereby provide a V-shaped groove, and during the spreading apart and bending of the side walls substantially maintaining the shape of the portions of the side walls radially outwardly of the bending zone.

2. The method of forming a sheave which comprises providing a body having a web and a rim, the latter having a base and a portion extending radially outwardly from the base and the base having lateral extensions at its sides projecting beyond the adjoining parts of the radially outwardly extending portion and providing radially inwardly facing annular shoulders, and the radially outwardly extending portion having converging outside faces connecting into its periphery, forming an annular radially outwardly opening groove in the radially outwardly extending portion with the groove extending to a zone between the extensions to thereby provide spaced side walls, supporting the body through the annular shoulders, and meanwhile spreading apart the side walls by applying rolling pressure thereon in a direction generally toward the axis of the sheave and bending the side walls about the base and extensions with the side walls free to spread apart until their outside faces connecting into the periphery reach substantially radial positions to thereby provide a V-shaped groove.

3. The method of forming a sheave which comprises providing a cast malleable iron body having a web and a rim, the latter having a base and a portion extending radially outwardly from the base, and the base having lateral extensions at its sides projecting beyond the adjoining parts of the radially outwardly extending portion, the base including the extensions providing radially inwardly facing annular shoulders, cold working the body by steps comprising forming an annular radially outwardly opening groove in the radially outwardly extending portion with the groove extending to a zone between the extensions to thereby provide spaced side walls connecting into the extensions, supporting the body independently of the web through the annular shoulders, meanwhile spreading apart the side walls by applying rolling pressure thereon in a direction generally toward the axis of the sheave and bending the side walls in opposite axially outward directions about the base and extensions to thereby provide a V-shaped groove, and during the spreading apart and bending of the side walls substantially maintaining the shape of the portions of the side walls radially outwardly of the bending zone.

4. The method of forming a sheave which comprises providing a cast malleable iron body having a web and a rim, the latter having a base and a portion extending radially outwardly from the base and the base having lateral extensions at its sides projecting beyond the adjoining parts of the radially outwardly extending portion, the base including the extensions providing radially inwardly facing annular shoulders and the radially outwardly extending portion having converging outside faces connecting into its periphery, cold working the body by steps comprising forming an annular radially outwardly opening groove in the radially outwardly extending portion with the groove extending to a zone between the extensions to thereby provide spaced side walls connecting into the extensions, supporting the body independently of the web through the annular shoulders, and meanwhile spreading apart the side walls by applying rolling pressure thereon in a direction generally toward the axis of the sheave and bending the side walls about the base and extensions with the side walls free to spread apart until their outside faces connecting into the periphery reach substantially radial positions to thereby provide a V-shaped groove.

CHRISTIAN L. EPPLER.